(12) United States Patent
Nagata et al.

(10) Patent No.: US 11,303,413 B2
(45) Date of Patent: Apr. 12, 2022

(54) COMMUNICATION CONTROL METHOD, RADIO COMMUNICATION SYSTEM, RADIO BASE STATION AND USER TERMINAL

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/681,067

(22) Filed: Aug. 18, 2017

(65) Prior Publication Data

US 2017/0366319 A1 Dec. 21, 2017

Related U.S. Application Data

(63) Continuation of application No. 14/405,279, filed as application No. PCT/JP2013/065056 on May 30, 2013, now Pat. No. 9,768,931.

(30) Foreign Application Priority Data

Jun. 4, 2012 (JP) .............................. JP2012-127184

(51) Int. Cl.
*H04W 72/04* (2009.01)
*H04W 92/20* (2009.01)
(Continued)

(52) U.S. Cl.
CPC .......... *H04L 5/0053* (2013.01); *H04L 5/0035* (2013.01); *H04L 5/0073* (2013.01);
(Continued)

(58) Field of Classification Search
CPC ..... H04L 5/001; H04L 5/0035; H04L 1/0026; H04L 1/0031; H04L 1/1861;
(Continued)

(56) References Cited

U.S. PATENT DOCUMENTS 8,054,767 B2   11/2011   Choi et al.
8,976,718 B2   3/2015    Joung et al.
(Continued)

FOREIGN PATENT DOCUMENTS

JP   2012503393 A   2/2012
WO  2011121774 A1  10/2011
(Continued)

OTHER PUBLICATIONS

International Search Report for corresponding International Application No. PCT/JP2013/065056, dated Jul. 30, 2013 (1 page).
(Continued)

*Primary Examiner* — Ahmed Elallam
(74) *Attorney, Agent, or Firm* — Osha Bergman Watanabe & Burton LLP

(57) ABSTRACT

A radio communication method for a user terminal performing communication in a cell where DL transmission and UL transmission vary in a time direction is provided. The radio communication method includes receiving downlink control information transmitted in a specific subframe; and analyzing a number and/or positions of subframes to be allocated for the DL transmission among subframes constituting a radio frame based on DL assignment in the downlink control information.

6 Claims, 12 Drawing Sheets

(51) Int. Cl.
  *H04L 5/00* (2006.01)
  *H04L 5/14* (2006.01)
(52) U.S. Cl.
  CPC .......... *H04L 5/0085* (2013.01); *H04L 5/0092* (2013.01); *H04L 5/14* (2013.01); *H04L 5/1469* (2013.01); *H04W 72/0446* (2013.01); *H04W 92/20* (2013.01)
(58) Field of Classification Search
  CPC ... H04L 5/0091; H04L 5/0073; H04L 5/0085; H04L 5/0092; H04L 5/0094; H04L 5/0096; H04L 5/0053; H04L 5/14; H04L 5/1469; H04W 72/042; H04W 72/082; H04W 24/00; H04W 24/02; H04W 72/0406; H04W 72/0426; H04W 72/0446; H04W 72/12; H04W 72/1278; H04W 72/1289; H04W 72/1294; H04W 72/14; H04W 92/02; H04W 92/20; H04J 11/0056
  See application file for complete search history.

(56) References Cited

U.S. PATENT DOCUMENTS

| | | | |
|---|---|---|---|
| 9,049,716 B2 | 6/2015 | Kitahara | |
| 9,119,196 B2* | 8/2015 | Nishio | H04W 72/042 |
| 9,197,683 B2* | 11/2015 | Fwu | H04W 36/0094 |
| 9,219,582 B2 | 12/2015 | Yano et al. | |
| 9,276,717 B2* | 3/2016 | Oizumi | H04L 5/14 |
| 9,407,390 B2 | 8/2016 | Lee et al. | |
| 9,432,136 B2 | 8/2016 | Kim et al. | |
| 9,544,823 B2* | 1/2017 | He | H04L 5/14 |
| 9,642,021 B2* | 5/2017 | Siomina | H04W 24/10 |
| 9,768,931 B2* | 9/2017 | Nagata | H04W 72/0446 |
| 9,775,149 B2* | 9/2017 | Fwu | H04W 52/0216 |
| 9,877,317 B2* | 1/2018 | He | H04W 88/06 |
| 9,918,306 B2* | 3/2018 | Lee | H04W 24/00 |
| 10,069,611 B2* | 9/2018 | Kim | H04L 5/0055 |
| 10,349,385 B2* | 7/2019 | Chen | H04W 72/042 |
| 2010/0080139 A1 | 4/2010 | Palanki et al. | |
| 2011/0211503 A1 | 9/2011 | Che et al. | |
| 2011/0261714 A1 | 10/2011 | Pan et al. | |
| 2012/0207124 A1 | 8/2012 | Liu et al. | |
| 2013/0039193 A1 | 2/2013 | Yin et al. | |
| 2013/0077523 A1 | 3/2013 | Ko et al. | |
| 2013/0142268 A1* | 6/2013 | Gao | H04W 76/14 375/252 |
| 2013/0182583 A1* | 7/2013 | Siomina | H04W 24/00 370/252 |
| 2013/0188516 A1 | 7/2013 | He et al. | |
| 2013/0194982 A1 | 8/2013 | Fwu et al. | |
| 2013/0272169 A1 | 10/2013 | Wang et al. | |
| 2013/0272170 A1 | 10/2013 | Chatterjee et al. | |
| 2013/0301489 A1 | 11/2013 | Sirotkin et al. | |
| 2013/0301490 A1 | 11/2013 | He et al. | |
| 2013/0301492 A1 | 11/2013 | Ji et al. | |
| 2014/0050107 A1 | 2/2014 | Charbit et al. | |
| 2014/0341095 A1 | 11/2014 | Yang et al. | |
| 2014/0369221 A1 | 12/2014 | Fu et al. | |
| 2015/0110039 A1 | 4/2015 | Nagata et al. | |
| 2015/0156765 A1 | 6/2015 | Kim et al. | |
| 2015/0195715 A1 | 7/2015 | Nagata et al. | |
| 2015/0264672 A1 | 9/2015 | Choi et al. | |
| 2015/0327255 A1 | 11/2015 | Tamaki et al. | |
| 2016/0157216 A1* | 6/2016 | Fwu | H04W 4/70 370/329 |
| 2017/0180096 A1* | 6/2017 | Kim | H04L 5/0078 |
| 2018/0139689 A1* | 5/2018 | Wang | H04W 4/70 |

FOREIGN PATENT DOCUMENTS

| | | |
|---|---|---|
| WO | 2011-155777 A2 | 12/2011 |
| WO | 2011-155777 A3 | 5/2012 |
| WO | 2012063837 A1 | 5/2012 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
Nokia Corporation et al.; "Discussion on Methods to support different time scales for TDD UL-DL reconfiguration;" 3GPP TSG-RAN WG1 Meeting #69, R1-122435; Prague, Czech Republic; May 21-25, 2012 (5 pages).
Samsung; "Dynamic reconfiguration of TDD UL-DL configuration;" 3GPP TSG RAN WG1 Meeting #69, R1-122267; Prague, Czech Republic; May 21-25, 2012 (2 pages).
Extended Search Report issued in corresponding European Application No. 13801003.8, dated Apr. 26, 2016 (15 pages).
Renesas Mobile Europe Ltd.; "Discussion on Enhancements for Dynamic TDD UL-DL Configuration"; 3GPP TSG-RAN WG1 Meeting #69, R1-122363; Prague, Czech Republic; May 21-25, 2012 (4 pages).
Alcatel-Lucent Shanghai Bell et al.; "Un Subframe Allocation for TDD"; 3GPP TSG RAN WG1 Meeting #62, R1-104411; Madrid, Spain; Aug. 23-27, 2010 (2 pages).
Office Action issued in the counterpart Japanese Patent Application No. 2012-127184, dated Jul. 5, 2016 (9 pages).
Office Action issued in corresponding Japanese Application No. 2012-127184, dated Oct. 18, 2016 (8 pages).
Alcatel-Lucent Shanghai Bell, Alcatel-Lucent; "Methods to support different time scales for TDD UL-DL reconfiguration"; 3GPP TSG RAN WG1 Meeting #69, R1-122508; Prague, Czech Republic; May 21-25, 2012 (2 pages).
Office Action issued in corresponding European Application No. 13801003.8, dated Jan. 11, 2017 (3 pages).
Summons to Attend Oral Proceedings issued in the counterpart European Patent Application No. 13801003.8, dated Nov. 15, 2017 (6 pages).
Office Action issued in the counterpart European Patent Application No. 13801003.8, dated Jun. 7, 2017 (4 pages).
Office Action issued in counterpart European Patent Application No. 13801003.8, dated Jul. 10, 2018 (10 Pages).
Extended European Search Report issued in counterpart European Patent Application No. 18174012.7, dated Jul. 30, 2018 (8 Pages).
Office Action issued in the counterpart Japanese Patent Application No. 2017-006567, dated Feb. 6, 2018 (7 pages).
Office Action issued in the counterpart European Patent Application No. 18174012.7, dated Mar. 13, 2019 (4 pages).

* cited by examiner

| CONFIGURATION PATTERN INDEX | NUMBER OF SUBFRAMES | SUBFRAME INDEX | | | | | | | | | |
|---|---|---|---|---|---|---|---|---|---|---|---|
| | | #0 | #1 | #2 | #3 | #4 | #5 | #6 | #7 | #8 | #9 |
| #10 | 1 | | | UL | | | | | | | |
| #11 | 2 | | | UL | UL | | | | | | |
| #12 | 3 | | | UL | UL | UL | | | | | |
| #13 | 4 | | | UL | UL | UL | UL | | | | |
| #14 | 5 | | | UL | UL | UL | UL | UL | | | |
| #15 | 6 | | | UL | UL | UL | UL | UL | UL | | |
| #16 | 7 | | | UL | UL | UL | UL | UL | UL | UL | |
| #17 | 8 | | | UL | UL | UL | UL | UL | UL | UL | UL |

: UL SUBFRAME

: SPECIAL SUBFRAME

COMMUNICATION CONTROL METHOD, RADIO COMMUNICATION SYSTEM, RADIO BASE STATION AND USER TERMINAL

CROSS REFERENCE TO RELATED APPLICATIONS

This application is a continuation application of U.S. patent application Ser. No. 14/405,279 filed Dec. 3, 2014, which is a national stage application of PCT/JP2013/065056 filed May 30, 2013, which claims priority to JP 2012-127184 filed Jun. 4, 2012. These applications are hereby incorporated by reference in their entirety.

TECHNICAL FIELD

The present invention relates to a communication control method, a radio communication system, a radio base station and a user terminal that are applicable to cellular systems and so on.

BACKGROUND

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band, which ranges from 1.4 MHz to 20 MHz. Also, in the UMTS network, successor systems of the LTE system (referred to as, for example, "LTE-Advanced" or "LTE enhancement" (hereinafter referred to as "LTE-A")) are under study for the purpose of achieving further broadbandization and increased speed.

In radio communication, as uplink (UL) and downlink (DL) duplexing methods, there are frequency division duplexing (FDD), which divides between the uplink and the downlink based on frequency, and time division duplexing (TDD), which divides between the uplink and the downlink based on time. In the event of TDD, the same frequency is applied to uplink and downlink transmission, so that the uplink and the downlink are divided based on time and transmitted from one transmitting point. Since the same frequency is used between the uplink and the downlink, a transmitting point (radio base station) and a user terminal both have to switch between transmission and reception alternately.

Also, in TDD in the LTE system, frame configurations (transmission ratios between uplink subframes and downlink subframes (DL/UL configurations)) to support a plurality of different types of asymmetrical uplink/downlink resource allocation are defined (see FIG. 1). In the LTE system, as shown in FIG. 1, seven frame configurations, namely DL/UL configurations 0 to 6, are defined, where subframes #0 and #5 are allocated to the downlink and subframe #2 is allocated to the uplink. Also, to prevent interference between transmitting points (or between cells), the same DL/UL configuration is applied between neighboring transmitting points.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

However, in TDD in the LTE-A system, in order to allow efficient use of radio resources, a study is in progress to change the transmission ratio of DL and UL dynamically or semi-statically in the time domain, per transmitting/receiving point—that is, change the DL/UL configuration to apply on a per transmitting/receiving point basis. When different DL/UL configurations are applied between neighboring transmitting/receiving points, cases might occur where, in the same time region/frequency region, a DL subframe and a UL subframe are transmitted at the same time between neighboring transmitting/receiving points (cases where an uplink signal and a downlink signal are transmitted at the same time).

In this case, depending on the location and transmission power of each transmitting/receiving point (or user terminal) and so on, there is a threat that interference is produced between transmitting/receiving points and between user terminals, and the performance of communication quality deteriorates.

The present invention has been made in view of the above, and it is therefore an object of the present invention to provide communication control method, a radio communication system, a radio base station and a user terminal that can reduce the deterioration of communication quality even when different DL/UL configurations are applied between neighboring transmitting/receiving points (radio base stations).

The communication control method of the present invention is a communication control method in a radio communication system in which a plurality of radio base stations that communicate with a user terminal by means of time division duplexing each change a DL/UL configuration independently, and this communication control method includes the steps in which each radio base station generates a control signal that designates the number and positions of subframes to be allocated for DL and/or UL transmission among subframes constituting a radio frame, and transmits the control signal to the user terminal on a downlink control channel of a specific subframe constituting the radio frame.

According to the present invention, it is possible to reduce the impact of interference even when different DL/UL configurations are applied between neighboring transmitting/receiving points (radio base stations).

DESCRIPTION OF EMBODIMENTS

Figure 1:
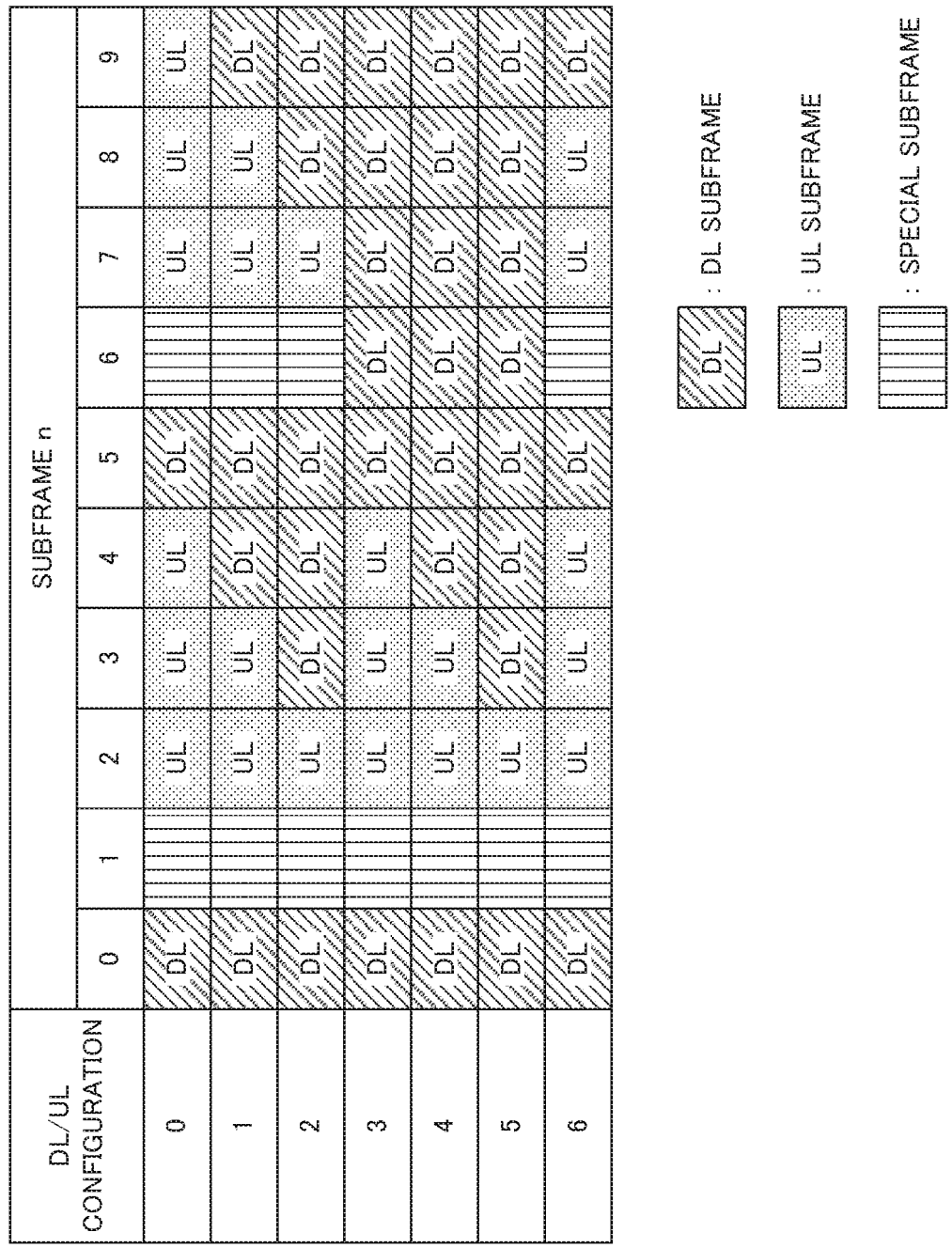
FIG. 1 is a diagram to explain examples of DL/UL configurations in TDD.
Figure 2A:
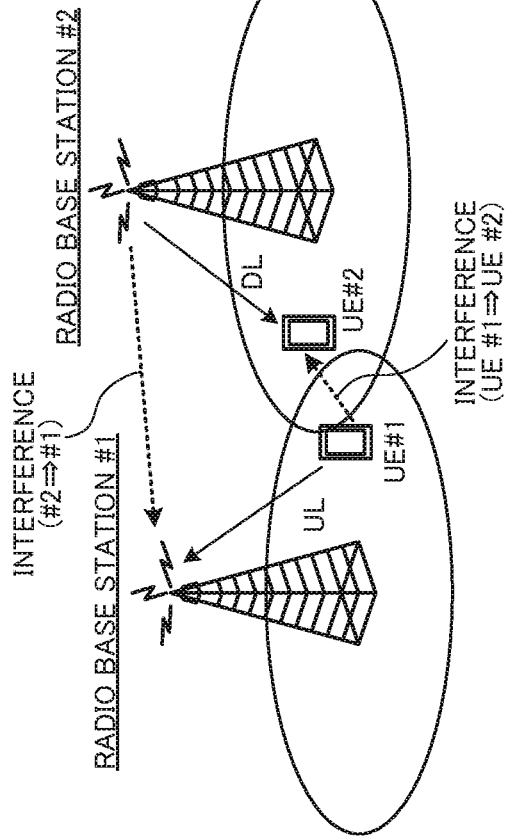
FIG. 2A provides a diagram to show an example of a radio communication system in accordance with one or more embodiments disclosed herein.

First, an example of a radio communication system where the present embodiment is applied will be described with reference to FIG. 2A. The radio communication system shown in FIG. 2A is formed to include a plurality of transmitting/receiving points (here, radio base stations #1 and #2), and user terminals #1 and #2 that communicate with radio base stations #1 and #2.

Also, in this radio communication system, radio communication between radio base station #1 and user terminal #1 (between radio base station #2 and user terminal #2) is conducted by means of time division duplexing (TDD). That is, in radio base stations #1 and #2, the same frequency regions are applied to DL and UL transmission, and transmission from each radio base station is conducted by dividing between DL and UL in the time domain.

In this case, as noted earlier, if different DL/UL configurations are applied between neighboring radio base stations #1 and #2, there is a threat of deterioration of communication quality performance due to interference between radio base stations #1 and #2 and interference between user terminals #1 and #2 in predetermined subframes.

Figure 2B:
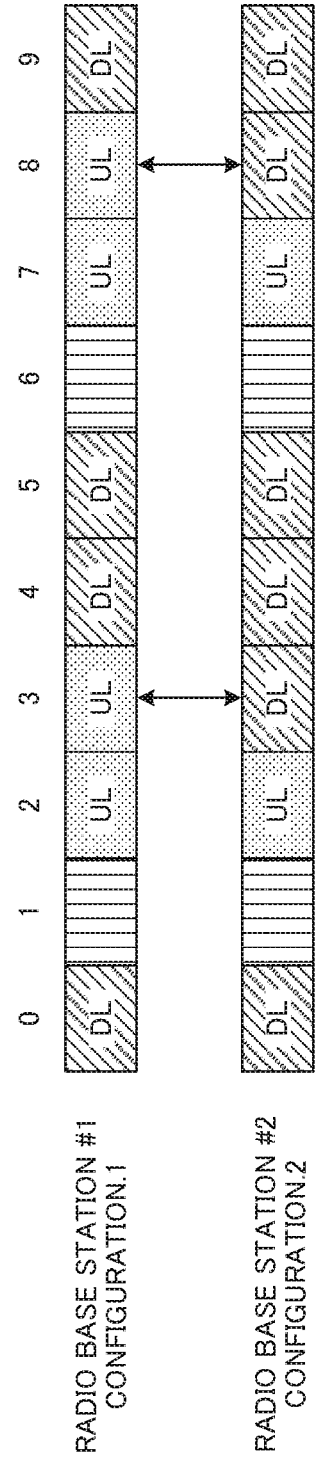
FIG. 2B provides a diagram to shown an example where different DL/UL configurations are applied between neighboring radio base stations in the radio communication system of FIG. 2A.

For example, when, as shown in FIG. 2B, radio base station #1 adopts DL/UL configuration 1 and radio base station #2 adopts DL/UL configuration 2 in a given period (here, in one radio frame), in subframes #3 and #8, radio base station #1 carries out UL transmission while radio base station #2 carries out DL transmission. That is, in the same time regions and in the same frequency regions, downlink signals are transmitted from radio base station #2 to user terminal #2, while uplink signals are transmitted from user terminal #1 to radio base station #1.

In this case, the signals that are transmitted from user terminal #2 to radio base station #2 become interference against the uplink signals transmitted from user terminal #1 to radio base station #1 (interference between radio base stations #1 and #2). Also, the uplink signals that are transmitted from user terminal #1 to radio base station #1 become interference against the downlink signals transmitted from radio base station #2 to user terminal #2 (interference between user terminals #1 and #2). As a result of this, there is a threat that the received quality of radio base station #1 and the received quality of user terminal #2 lower in subframes #3 and #8.

So, the present inventors have found out that, by allowing each radio base station to adequately control the DL/UL configuration taking into account the level of interference between transmitting/receiving points (radio base stations) or between user terminals, it is possible to reduce the deterioration of communication quality even when different DL/UL configurations are applied between neighboring transmitting/receiving points.

Now, the present embodiment will be described below in detail with reference to the accompanying drawings. Note that an example with two transmitting/receiving points (radio base stations) will be shown in the following description for ease of explanation. However, the number of transmitting/receiving points which the present invention can employ is not limited to this and can be changed as appropriate.

Figure 3:
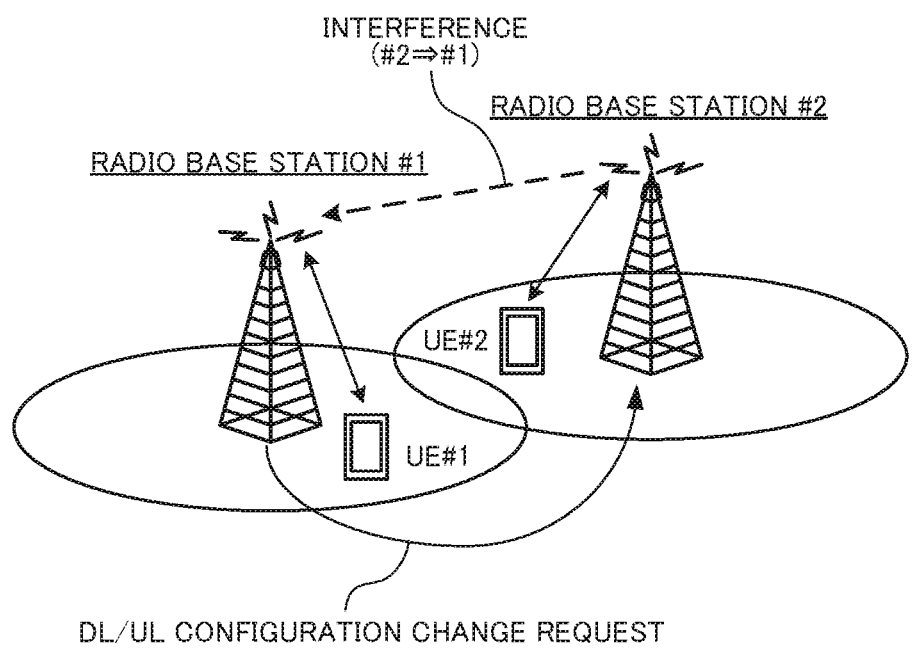
FIG. 3 is a diagram to explain an example of a radio communication system according to one or more embodiments.

FIG. 3 shows an example of a radio communication system according to the present embodiment. The radio communication system of FIG. 3 is formed to include a plurality of transmitting/receiving points (here, radio base stations #1 and #2) and user terminals #1 and #2 that are connect to radio base stations #1 and #2, respectively. Note that radio base stations #1 and #2 are able to communicate information with each other through wire connection such as optical fiber and so on, or through wireless connection.

To radio communication between radio base station #1 and user terminal #1 and between radio base station #2 and user terminal #2, time division duplexing (TDD) is applied. Also, in the radio communication system shown in FIG. 3, radio base stations #1 and #2 separately (independently) change and control the DL/UL transmission ratio (DL/UL configuration) in the time domain. In this case, radio base stations #1 and #2 each select an arbitrary DL/UL configuration from DL/UL configurations that are provided in advance. Note that the details of the DL/UL configurations selected in radio base stations #1 and #2 will be described later.

When different DL/UL configurations are applied between neighboring radio base stations #1 and #2, a downlink signal and an uplink signal are transmitted in the same frequency region/the same time region between the neighboring radio base stations (or between cells). For example, as shown in FIG. 3, for radio base station #1 that receives an uplink signal from user terminal #1, a downlink signal that is transmitted from another radio base station #2 to user terminal #2 becomes an interference signal. Because such interference signals exist, the overall communication quality of the radio communication system deteriorates.

So, with the radio communication system according to the present embodiment, each radio base station communicates with serving user terminals by dynamically switching the DL/UL configuration to adopt on a per radio frame basis. Based on the level of interference to receive from other radio base stations, each radio base station requests changes of the DL/UL configuration to other radio base stations. By this means, each radio communication adopts a common DL/UL configuration with other radio base stations and communicates with serving user terminals. As a result of this, it is possible to reduce the impact of interference between radio base stations and between user terminals, and reduce the deterioration of the overall communication quality of the radio communication system.

Upon switching the DL/UL configuration dynamically, each radio base station reports information related to subframes for DL and/or UL transmission (hereinafter referred to as "DL/UL subframe information") by means of, for example, a downlink control channel (PDCCH, ePDCCH) that is allocated to a specific subframe in a radio frame. This DL/UL subframe information includes the number and positions of subframes for DL and/or UL transmission. By demodulating this downlink control channel, the user terminal can specify the subframes where the downlink data channel (PDSCH) for that user terminal is allocated, the subframes to allocate an uplink control channel (PUCCH) and an uplink data channel (PUSCH) to.

Note that the PDCCH (downlink control channel) is a downlink control channel that is placed over a predetermined number of OFDM symbols (one to three OFDM symbols) from the top of a subframe, and is a control channel that is time-division-multiplexed with the PDSCH (downlink shared data channel). Also, the ePDCCH (also referred to as "enhanced downlink control channel," "E-PDCCH," "Enhanced PDCCH," "FDM-type PDCCH," "UE-PDCCH" and so on) is a control channel that is placed to be frequency-division-multiplexed with the PDSCH.

Figure 4:
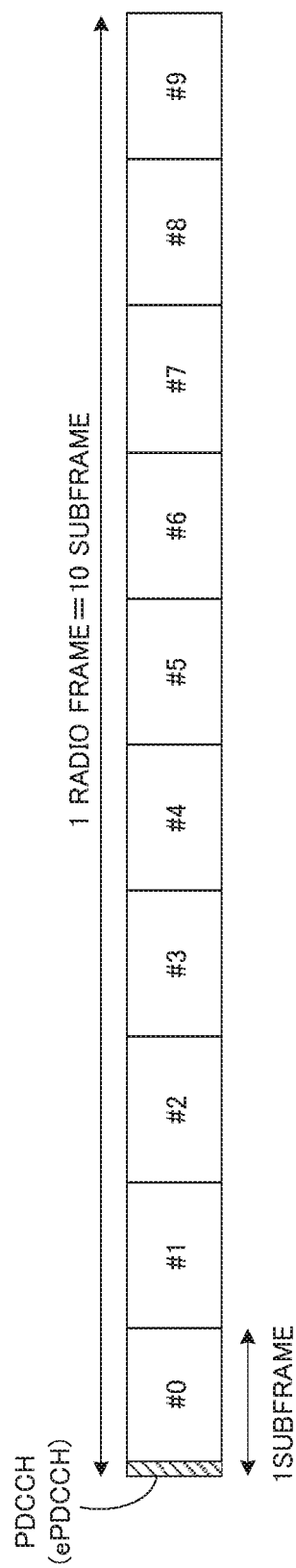
FIG. 4 is a diagram to explain an example of a radio frame for reporting DL/UL subframe information in a radio communication system according to one or more embodiments.

FIG. 4 is a diagram to explain an example of a radio frame for reporting DL/UL subframe information in the radio communication system according to the present embodiment. For example, DL/UL subframe information may be reported in the downlink control channel (PDCCH, ePDCCH) that is allocated to the top subframe (subframe #0) of a radio frame. In this way, by setting in advance a specific subframe in a radio frame as the subframe to allocate DL/UL subframe information to, it is not necessary to report the specific subframe to a user terminal in advance. By this means, the control upon reporting DL/UL subframe information from each radio base station to user terminals can be simplified.

Note that the subframe to allocate DL/UL subframe information to is by no means limited to subframe #0 at the top. For example, DL/UL subframe information may be allocated to subframes other than top subframe #0 as well. Also, it is possible to report the subframe where DL/UL subframe information is allocated to user terminals through broadcast signals, higher layer signaling (for example, RRC signaling) and so on. In this way, by reporting a specific subframe where DL/UL subframe information is allocated by broadcast signals and RRC signaling, it is possible to flexibly change the subframe to allocate DL/UL subframe information to, depending on the communication environment.

In the radio communication system according to the present embodiment, the number and positions of subframes for DL and/or UL transmission included in DL/UL subframe information are determined in advance. For example, the number and positions of subframes for DL and/or UL transmission are managed by means of a table. In this management table, subframe positions are defined in association with numbers of subframes for DL and/or UL transmission. In this way, by determining the number and positions of subframes for DL and/or UL transmission in advance, it is not necessary to determine the number and positions of subframes to be allocated for DL and/or UL transmission every time a downlink control channel signal (control signal) is generated. By this means, it becomes possible to simplify the process upon generating downlink control channel signals. Also, it is possible to simplify the control when selecting a DL/UL configuration that is common between radio base stations.

Figure 5:
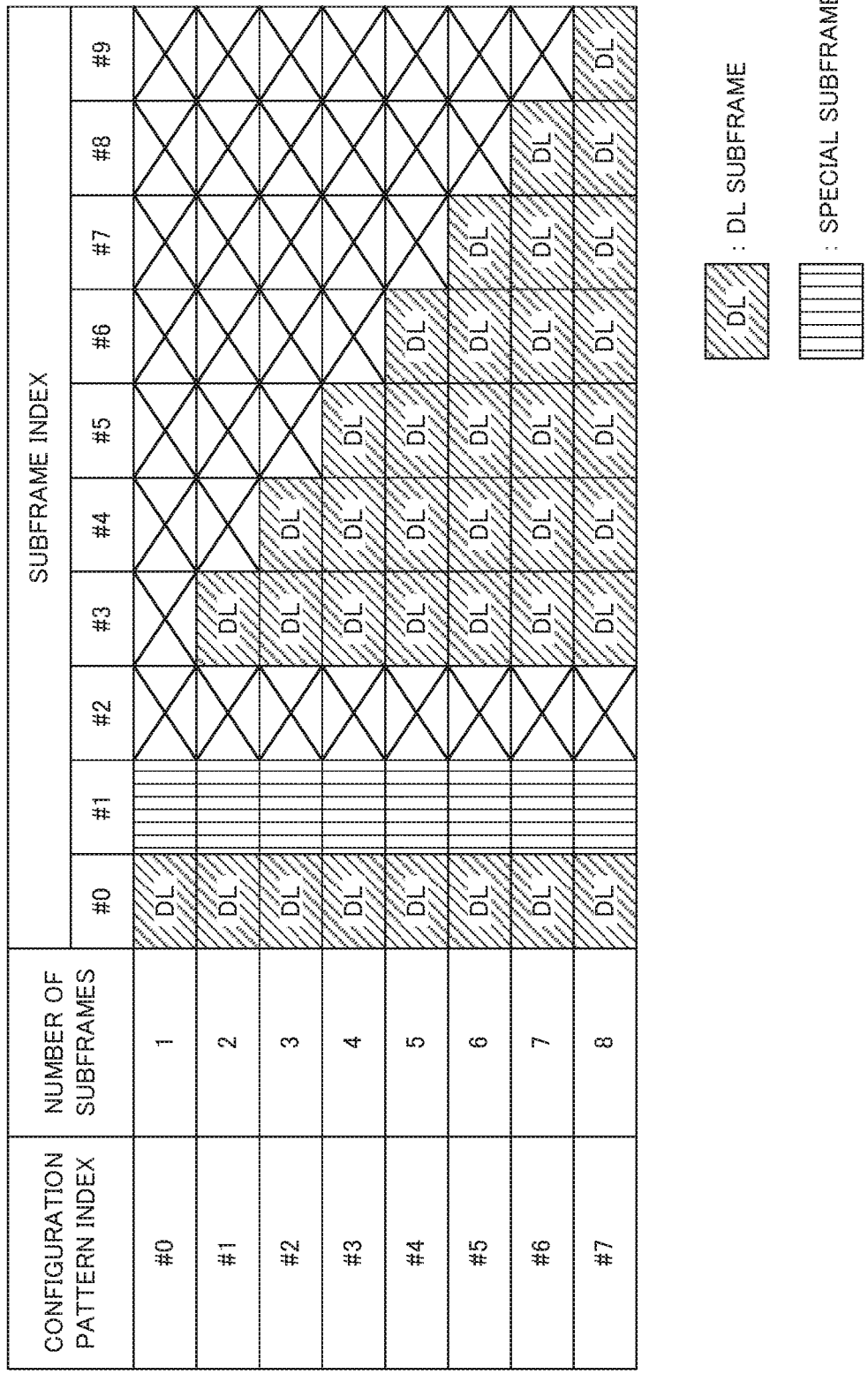
FIG. 5 is a diagram to explain an example of a DL subframe information management table in a radio communication system according to one or more embodiments.
Figure 6:
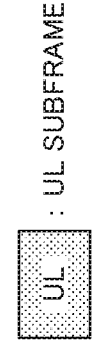
FIG. 6 is a diagram to explain an example of a UL subframe information management table in a radio communication system according to one or more embodiments.
Figure 6:

FIG. 5 and FIG. 6 are diagrams to explain examples of DL/UL subframe information management tables in the radio communication system according to the present embodiment. FIG. 5 shows an example of a DL subframe information management table. FIG. 6 shows an example of a UL subframe information management table. Note that the configurations of the DL/UL subframe information management tables are not limited to the contents shown in FIG. 5 and FIG. 6.

As shown in FIG. 5 and FIG. 6, in the management tables, DL/UL configuration pattern indices (configuration pattern indices), numbers of subframes for DL or UL transmission, and the indices of subframes that are allocated as subframes for DL or UL transmission (that is, the positions of subframes for DL or UL transmission). Note that, in both management tables, subframe #1 is designated a special subframe. Consequently, subframe #1 is never allocated as a subframe for DL or UL transmission.

As shown in FIG. 5, in the DL subframe information management table, when the number of subframes is one (in the event of pattern index #0), a subframe for DL transmission is allocated to subframe #0 alone. Also, when the number of subframes is two (in the event of pattern index #1), subframes for DL transmission are allocated to subframes #0 and #3. Then, as the number of subframes increases one by one, the number of subframes where subframes for DL transmission are allocated increases one by one, from subframe #4 onward. Note that when the number of subframes is eight (in the event of pattern index #7), subframes for DL transmission are allocated to all the subframes except for subframe #1 and #2.

Meanwhile, as shown in FIG. 6, in the UL subframe information management table, when the number of subframes is one (in the event of pattern index #10), a subframe for UL transmission is allocated to subframe #2 alone. Also, when the number of subframes is two (in the event of pattern index #11), subframes for UL transmission are allocated to subframes #2 and #3. Then, as the number of subframes increases one by one, the number of subframe where subframe for UL transmission are allocated increase one by one, from subframe #4 onward. Note that, when the number of subframes is eight (in the event of pattern index #17), subframe for UL transmission are allocated to all the subframes except for subframe #0 and #1.

Figure 7:
FIG. 7 is a diagram to explain example of a DL/UL subframe information management table in a radio communication system according to one or more embodiments.

FIG. 7 shows an example of a management table to manage both DL subframe information and UL subframe information. Note that FIG. 7 illustrates a case where three or fewer pieces of UL subframe information are allocated. In the management table shown in FIG. 7, the number of subframes for DL transmission and the number of subframes for UL transmission are defined as the number of subframes. Also, in the management table shown in FIG. 7, subframes for DL transmission are allocated in the same manner as in the DL subframe information management table shown in FIG. 5, and subframes for UL transmission are allocated to the other subframes. When the numbers of subframes for DL transmission and subframes for UL transmission are one and three (in the event of pattern index #20), respectively, a subframe for DL transmission is allocated to subframe #0 alone, and subframes for UL transmission are allocated to subframes #2 to #4. Meanwhile, when the numbers of subframes for DL transmission and subframes for UL transmission are seven and two (in the event of pattern index

26), respectively, subframes for DL transmission are allocated to subframes #0 and #3 to #8, and subframes for UL transmission are allocated to subframes #2 and #9.

These management tables are managed in each radio base station. That is, each radio base station shares these management tables. With the example shown in FIG. 7, a DL/UL subframe information management table in which three or fewer pieces of UL subframe information are allocated is shown. In addition to this, in each radio base station, a DL/UL subframe information management table, in which three or other numbers of pieces of UL subframe information are allocated, is also shared.

Each radio base station separately (independently) changes and controls the DL/UL configuration in the time domain. In this case, each radio base station switches the DL/UL configuration dynamically with reference to the above management tables. For example, when interference is produced between transmitting/receiving points (radio base station), a DL/UL configuration that is common with other radio base stations is selected. Then, each radio base station reports DL/UL subframe information that corresponds to the selected DL/UL configuration to the serving user terminals through a downlink control channel. To be more specific, each radio base station transmits a control signal to designate DL/UL subframe information to the serving user terminals through the downlink control channel.

The number and positions of subframes for DL transmission corresponding to the DL/UL configuration that is selected may be included, for example, in a DL assignments in the downlink control information (DCI) that is transmitted in the downlink control channel. In this way, by designating the number and positions of subframes for DL transmission in a DL assignment within DCI, it is possible to report the number and positions of subframes for DL transmission to user terminals without having to make significant changes to conventional specifications.

Meanwhile, the number and positions of subframes for UL transmission corresponding to the DL/UL configuration that is selected may be included, for example, in a UL grant in downlink control information (DCI) that is transmitted in the downlink control channel. In this way, by designating the number and positions of subframes for UL transmission in a UL grant within DCI, it is possible to report the number and positions of subframes for UL transmission to user terminals without having to make significant changes to conventional specifications.

For example, when the DL/UL configuration of pattern index #2 in the management table shown in FIG. 5 is selected, each radio base station includes the number of subframes (three) and their positions (subframes #0, #3 and #4) in the DL assignment in downlink control information (DCI). Also, when the DL/UL configuration of pattern index #12 in the management table shown in FIG. 6 is selected, each radio base station includes the number of subframes (three) and their positions (subframes #2, #3 and #4) in the UL grant in downlink control information (DCI). Furthermore, when the DL/UL configuration of pattern index #22 in the management table shown in FIG. 7 is selected, each radio base station includes the number of subframes (three) and their positions (subframes #0, #3 and #4) in the DL assignment in downlink control information (DCI), and includes the number of subframes (three) and their positions (subframes #2, #5 and #6) in the UL grant.

Figure 8:
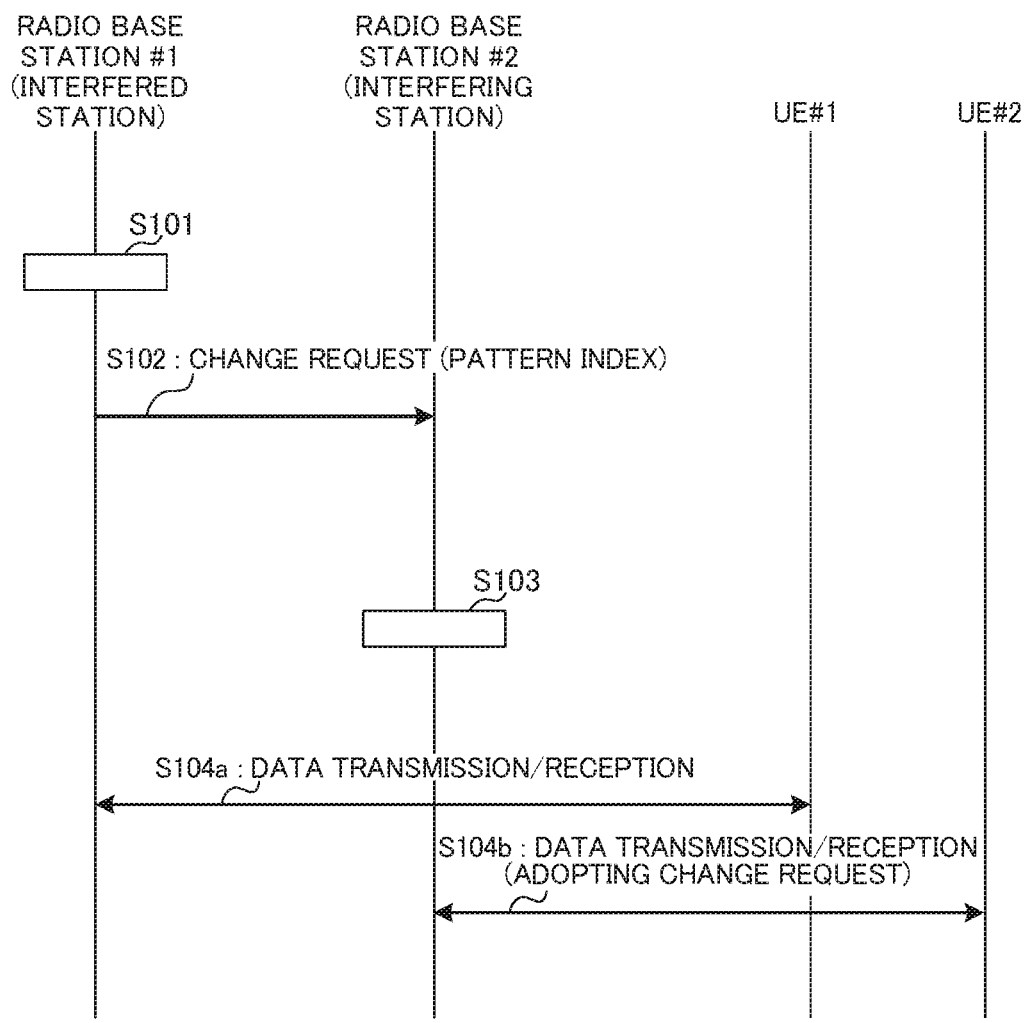
FIG. 8 is an example of a sequence diagram to show a communication control method in a radio communication system according to one or more embodiments.

Now, an example of a sequence of a communication control method in the radio communication system according to the present embodiment will be described below with reference to FIG. 8. Here, a case will be described where radio base station #1 shown in FIG. 3 reports a DL/UL configuration change request (hereinafter referred to simply as "change request") to another radio base station #2 based on the level of interference from the other radio base station #2. Note that, although a case will be shown with the following description where radio base station #1 (the interfered station in FIG. 3) transmits a change request signal to another radio base station #2 (the interfering station in FIG. 3), the other radio base station #2 is also able to perform the same processes as those by radio base station #1.

First, radio base station #1 measures the level of interference from another radio base station #2 (step S101). Note that the level of interference according to the present embodiment refers to, for example, path loss, penetration loss, antenna gain and so on. For example, the path loss of an uplink channel (between radio base station #1 and user terminal #1) may be measured. Note that when there is a plurality of other radio base stations, the resulting level of interference is the total value of the levels of interference from this plurality of other radio base stations.

Also, in step S101, radio base station #1 determines whether or not the level of interference that is measured is greater than a predetermined reference value (threshold value #1) regarding the level of interference. Threshold value #1 is the reference value for determining the impact of interference from the other radio base station #2 to radio base station #1. Radio base station #1 determines whether or not to issue a DL/UL configuration change request based on this threshold value #1.

Note that the predetermined reference value (threshold value #1) may be shared between radio base stations or may differ between radio base stations. Also, the predetermined reference value (threshold value #1) may be configured to be reported to radio base station #1 by means of broadcast signals, higher layer signaling (for example, RRC signaling) and so on. Also, the predetermined reference value (threshold value #1) may be reported to radio base station #1 via X2 signaling, optical fiber and so on. Besides, it is also possible to memorize threshold value #1 in a memory section of radio base station #1 in advance, so that radio base station #1 can apply threshold value #1 that is memorized.

When the level of interference from the other radio base station #2 is greater than a predetermined reference value (threshold value #1), downlink signals that are transmitted from the other radio base station #2 have impact on radio base station #1, which receives uplink signals transmitted from user terminal #1. In this case, radio base station #1 request a change of the DL/UL configuration to the other radio base station #2 (step S102).

To be more specific, radio base station #1 transmits a change request signal to request a change of the DL/UL configuration to the other radio base station #2 so that the other radio base station #2 adopts the same DL/UL configuration as in radio base station #1. Note that this change request signal includes the pattern index of the DL/UL configuration after the change (that is, the same DL/UL configuration as in radio base station #1).

The other radio base station #2, having received the change request signal from radio base station #1, selects the DL/UL configuration corresponding to the DL/UL configuration pattern index included in the change request signal (step S103). Also, in step S103, radio base station #2 changes the presently adopted DL/UL configuration to the DL/UL configuration that is selected.

By this means, the DL/UL configuration that is adopted in radio base station #2 is changed to the same DL/UL configuration as the DL/UL configuration adopted in radio base station #1. Note that, in the DL/UL configuration after the change, common DL transmission or UL transmission is carried out in the same time regions and the same frequency regions. Consequently, it is possible to reduce the interference produced between radio base stations #1 and #2 and the interference between user terminals #1 and #2.

Then, radio base stations #1 and #2 each generate a control signal that designates DL/UL subframe information corresponding to the DL/UL configuration to be adopted. Then, the generated control signals are transmitted to serving user terminals #1 and #2 through the downlink control channel of specific subframes in a radio frame. User terminals #1 and #2 receive these control signals, and analyze the DL/UL subframe information that is designated in the control signals. After that, radio base stations #1 and #2 each adopt a DL/UL configuration that reflects the change request reported from the other radio base station, and conduct radio communication with serving user terminals #1 and #2 (steps S104a and 104b).

With the radio communication system according to the present embodiment, among subframes that constitute a radio frame, a control signal to designate DL/UL subframe information is transmitted on a downlink control channel of a specific subframe (for example, the top subframe) in that radio frame. By this means, it is possible to change the DL/UL configuration to adopt, dynamically, on a per radio frame basis. As a result of this, even when different DL/UL configurations are adopted between neighboring transmitting/receiving points (radio base stations), it is still possible to reduce the impact of interference between radio base stations and between user terminals by adequately switching and controlling the DL/UL configuration, and reduce the deterioration of communication quality.

In particular, with the radio communication system according to the present embodiment, when a change request signal to request a change of the DL/UL configuration is received from another radio base station, a control signal to designate DL/UL subframe information is generated. Consequently, it is possible to switch the DL/UL configuration only when it is necessary to change the DL/UL configuration. As a result of this, it is possible to apply different DL/UL configurations between neighboring transmitting/receiving points (radio base stations) and still reduce the impact of interference between radio base stations and between user terminals as needed.

Now, the sequence shown in FIG. 8 will be described using specific examples. Assume that, for example, in a given period (here, one radio frame), radio base station #1 adopts the DL/UL configuration of pattern index #21 shown in FIG. 7, and radio base station #2 adopts the DL/UL configuration of pattern index #22 shown in FIG. 7. In this case, in subframe #4, radio base station #2 carries out DL transmission, and radio base station #1 carries out UL transmission. That is, in the same time regions and in the same frequency regions, downlink signals are transmitted from radio base station #2 to user terminal #2, while uplink signals are transmitted from user terminal #1 to radio base station #1.

The downlink signals that are transmitted from radio base station #2 to user terminal #2 become interference against the uplink signals transmitted from user terminal #1 to radio base station #1 (interference between radio base stations #1 and #2). Also, the uplink signals that are transmitted from user terminal #1 to radio base station #1 become interference against the downlink signals transmitted from radio base station #2 to user terminal #2 (interference between user terminals #1 and #2). Radio base station #1 measures these interference levels (step S101). Assume here that the levels of interference that arise here are greater than a predetermined reference value.

In this case, radio base station #1 transmits a change request signal to request a change of the DL/UL configuration to the other radio base station #2 so that the other radio base station #2 adopts the same DL/UL configuration as in radio base station #1 (step S102). This change request signal includes pattern index #21 of the DL/UL configuration after the change (that is, the same DL/UL configuration as in radio base station #1).

The other radio base station #2 selects the DL/UL configuration corresponding to DL/UL configuration pattern index #21 included in this change request signal (step S103). Then, the other radio base station #2 adopts the selected DL/UL configuration as the DL/UL configuration then and later. In this case, the DL/UL configurations to be adopted in radio base station #1 and radio base station #2 both become the DL/UL configuration of pattern index #21 shown in FIG. 7. By this means, in subframe #4, which is the source of interference, radio base station #1 and radio base station #2 carry out UL transmission. Consequently, the interference that is produced between radio base stations #1 and #2 and the interference produced between user terminals #1 and #2 are reduced.

Then, radio base stations #1 and #2 each generate a control signal to designate DL/UL subframe information that corresponds to the DL/UL configuration of pattern index #21. Then, the generated control signals are transmitted to serving user terminals #1 and #2 in the downlink control channel of a specific subframe in a radio frame. User terminals #1 and #2 receive these control signals and analyze the DL/UL subframe information designated by the control signals. After that, radio base stations #1 and #2 each adopt the DL/UL configuration of pattern index #21 shown in FIG. 7, and conduct radio communication with serving user terminals #1 and #2 (steps S104a and 104b).

Figure 9:
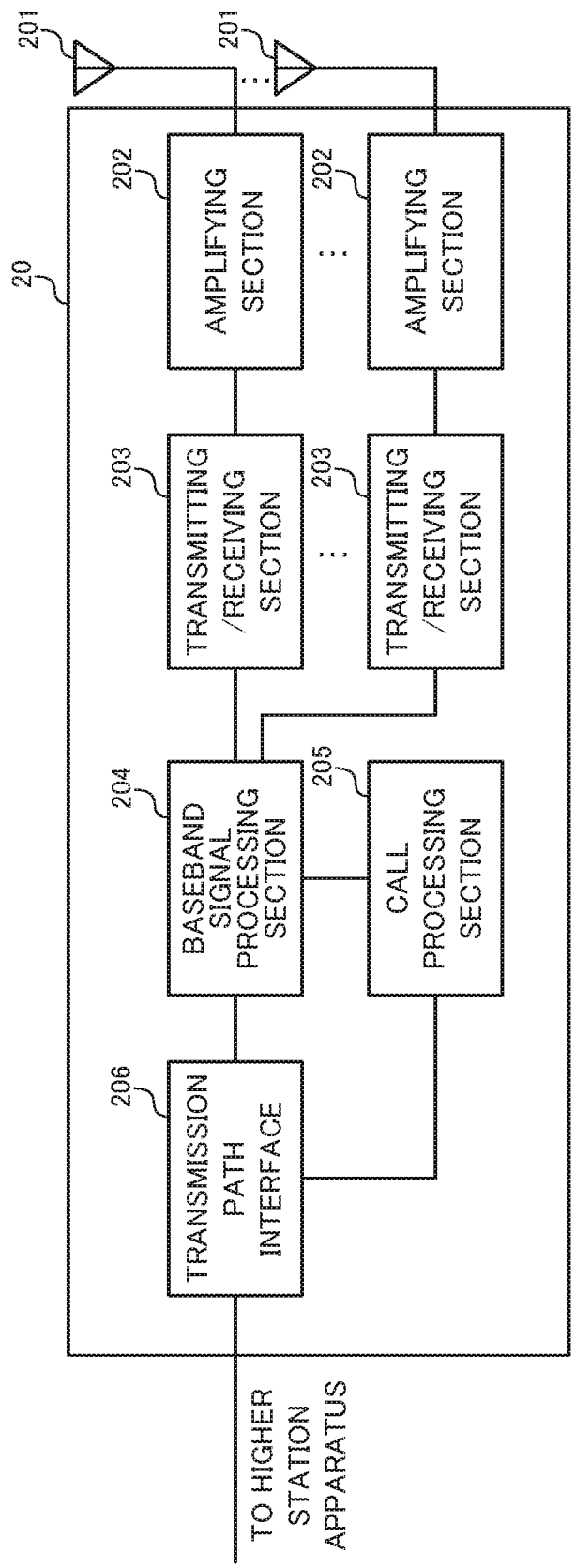
FIG. 9 is a diagram to explain an overall configuration of a radio base station.

An overall configuration of a radio base station 20 according to the present embodiment will be described with reference to FIG. 9. As shown in FIG. 9, the radio base station 20 has transmitting/receiving antennas 201, amplifying sections 202, transmitting/receiving sections (transmitting sections/receiving sections) 203, a baseband signal processing section 204, a call processing section 205, and a transmission path interface 206. Transmission data that is transmitted from the radio base station 20 to user terminals on the downlink is input from the higher station apparatus, into the baseband signal processing section 204, via the transmission path interface 206.

In the baseband signal processing section 204, a downlink data channel signal is subjected to a PDCP layer process, division and coupling of transmission data, RLC (Radio link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal to perform radio communication with the radio base station 20, to the user terminals connected to the same cell, by a broadcast channel. The information for allowing communication in the cell includes, for example, the uplink or downlink system bandwidth, root sequence identification information (root sequence indices) for generating random access preamble signals in the PRACH (Physical Random Access Channel), and so on.

Baseband signals that are output from the baseband signal processing section 204 are converted into a radio frequency band in the transmitting/receiving sections 203. The amplifying sections 202 amplify the radio frequency signals having been subjected to frequency conversion, and output the results to the transmitting/receiving antennas 201.

Meanwhile, as for signals to be transmitted from user terminals to the radio base station 20 on the uplink, radio frequency signals that are received in the transmitting/receiving antennas 201 are amplified in the amplifying sections 202, converted into baseband signals through frequency conversion in the transmitting/receiving sections 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signals received on the uplink. The decoded signals are transferred to the higher station apparatus through the transmission path interface 206.

The call processing section 205 performs call processing such as setting up and releasing communication channels, manages the state of the radio base station 20 and manages the radio resources.

Figure 10:
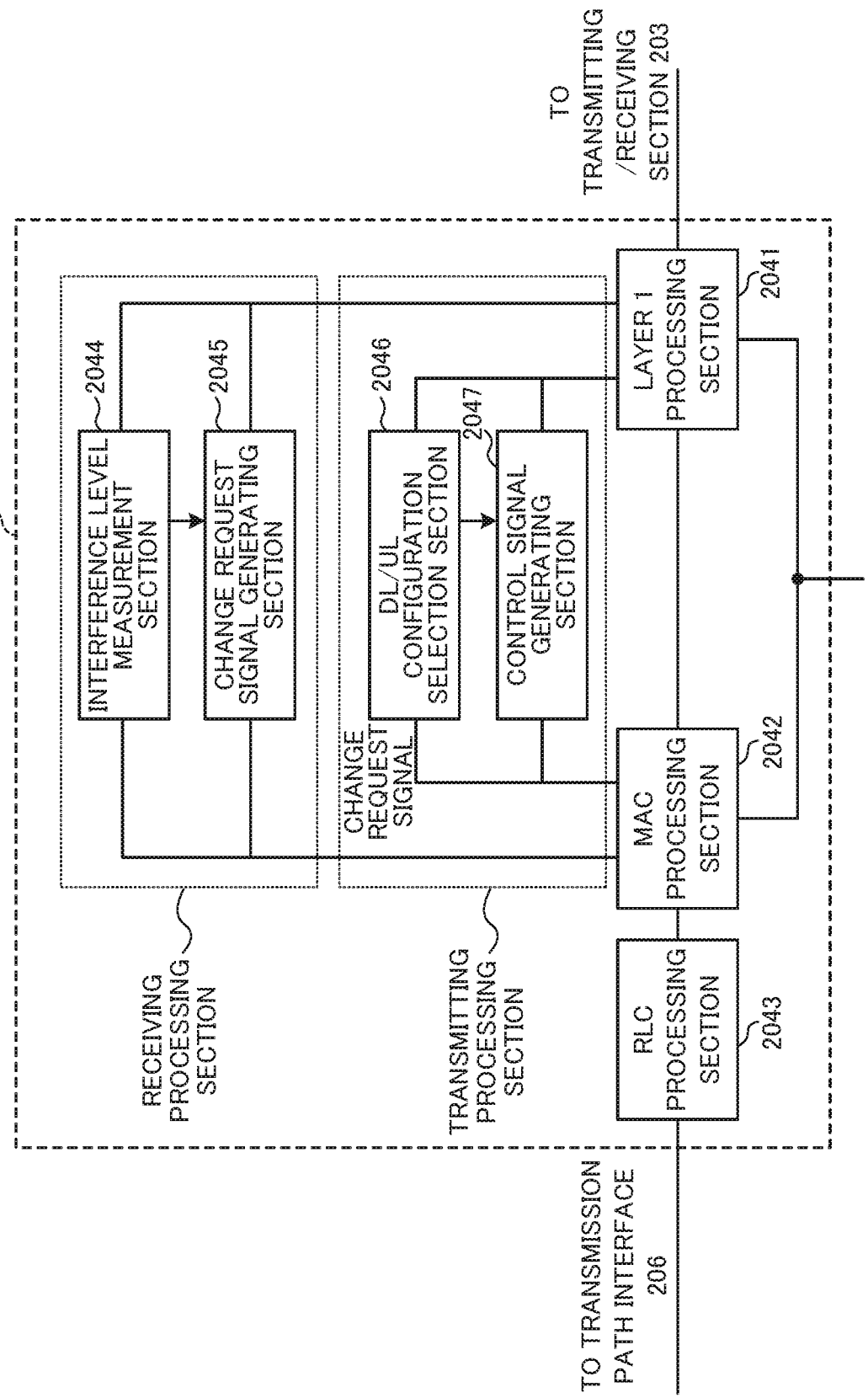
FIG. 10 is a functional block diagram corresponding to a baseband processing section of a radio base station.

FIG. 10 is a block diagram to show a configuration of a baseband signal processing section in the radio base station shown in FIG. 9. The baseband signal processing section 204 is primarily formed with a layer 1 processing section 2041, a MAC processing section 2042, an RLC processing section 2043, an interference level measurement section 2044, a change request signal generating section 2045, a DL/UL configuration selection section 2046 and a control signal generating section 2047. Note that the control signal generating section 2047 constitutes a signal generating section.

The layer 1 processing section 2041 mainly performs processes related to the physical layer. For example, the layer 1 processing section 2041 applies processes to signals received on the uplink, including channel decoding, a discrete Fourier transform (DFT), frequency demapping, an inverse fast Fourier transform (IFFT), data demodulation and so on. Also, the layer 1 processing section 2041 performs processes for signals to transmit on the downlink, including channel coding, data modulation, frequency mapping and an inverse fast Fourier transform (IFFT) and so on.

The MAC processing section 2042 performs processes for signals that are received on the uplink, including MAC layer retransmission control, scheduling for the uplink/downlink, transport format selection for the PUSCH/PDSCH, resource block selection for the PUSCH/PDSCH, and so on.

The RLC processing section 2043 performs, for packets that are received on the uplink/packets to transmit on the downlink, packet division, packet combining, RLC layer retransmission control and so on.

The interference level measurement section 2044 measures the level of interference from other radio base stations. For example, with the example shown in FIG. 3, the interference level measurement section 2044 in radio base station #1 measures the level of interference from another radio base station #2. For the measurement of the level of interference, path loss, penetration loss, antenna gain and so on may be used, and, for example, the path loss of an uplink channel (between radio base station #1 and user terminal #1) may be measured.

Based on the interference level measured in the interference level measurement section 2044, the change request signal generating section 2045 generates a change request signal to request a change of the DL/UL configuration to the other base station. For example, with the example shown in FIG. 3, the change request signal generating section 2045 in radio base station #1 determines whether or not the level of interference from the other radio base station #2 is greater than a predetermined reference value (threshold value #1), and, if it is, generates a change request signal.

In this case, the change request signal generating section 2045 in radio base station #1 generates a change request signal to request a change of the DL/UL configuration to the other radio base station #2 so that the other radio base station #2 adopts the same DL/UL configuration as in radio base station #1. Note that this change request signal includes a DL/UL configuration pattern index that is determined in advance (see FIG. 5 to FIG. 7). For example, the change request signal generating section 2045 specifies a DL/UL configuration pattern index with reference to the management tables shown in FIG. 5 to FIG. 7. The change request signal generated in the change request signal generating section 2045 is transmitted to the other radio base station #2 by wire or by wireless.

The DL/UL configuration selection section 2046 selects a DL/UL configuration based on the change request signal transmitted from the other radio base station. To be more specific, the DL/UL configuration selection section 2046 selects a DL/UL configuration in accordance with the DL/UL configuration pattern index designated in the change request signal. For example, the DL/UL configuration selection section 2046 selects DL/UL configuration with reference to the management tables shown in FIG. 5 to FIG. 7.

Based on the DL/UL configuration selected in the DL/UL configuration selection section 2046, the control signal generating section 2047 generates a control signal (downlink control channel signal: PDCCH, ePDCCH) that designates DL/UL subframe information in a radio frame. The DL/UL subframe information includes the number and positions of subframes for DL and/or UL transmission. For example, when the DL/UL configuration of pattern index #22 in the management table shown in FIG. 7 is selected, the control signal generating section 2047 generates a control signal which includes the number of DL subframes (three) and their positions (subframes #0, #3 and #4) in the DL assignment in downlink control information (DCI), and the number of UL subframes (three) and their positions (subframes #2, #5 and #6) in the UL grant.

The control signal generated in the control signal generating section 2047 is output to the layer 1 processing section 2041. The layer 1 processing section 2041 allocates this control signal to the downlink control channel (PDCCH, ePDCCH) of a specific subframe constituting the radio frame. For example, the layer 1 processing section 2041 allocates a control signal that designates DL/UL subframe information to the downlink control channel (PDCCH, ePDCCH) of subframe #0, which is at the top of the radio frame. This control signal is transmitted to the user terminals via the transmitting/receiving section 203 as transmission sections.

Figure 11:
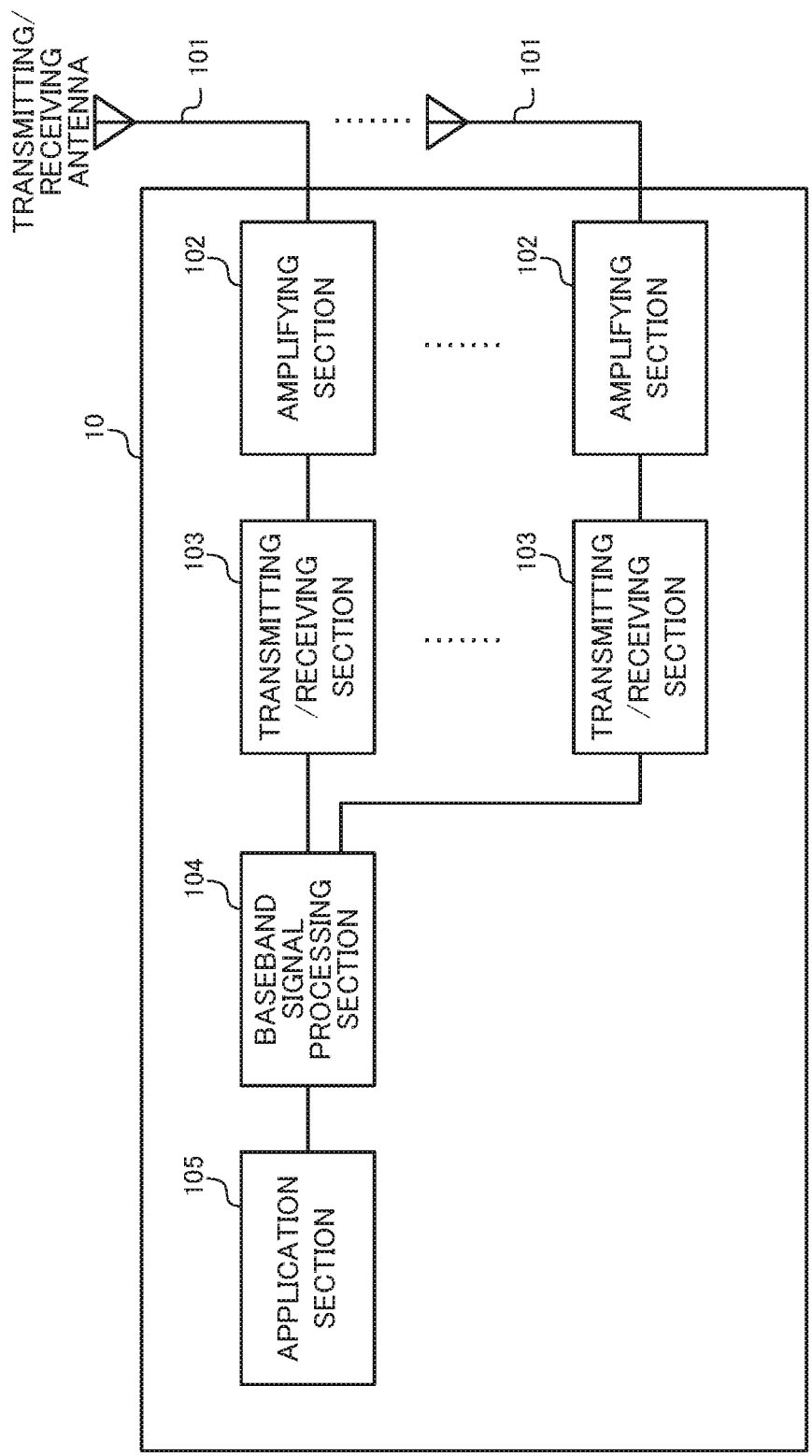
FIG. 11 is a diagram to explain an overall configuration of a user terminal.

Next, an overall configuration of a user terminal according to the present embodiment will be described with reference to FIG. 11. As shown in FIG. 11, a user terminal 10 has transmitting/receiving antennas 101, amplifying sections 102, transmitting/receiving sections (transmitting sections/receiving sections) 103, a baseband signal processing section 104, and an application section 105.

As for downlink data, radio frequency signals that are received in the transmitting/receiving antennas 101 are amplified in the amplifying sections 102, and converted into baseband signals through frequency conversion in the transmitting/receiving sections 103. The baseband signals are subjected to an FFT process, error correction decoding a retransmission control receiving process and so on in the baseband signal processing section 104. In this downlink data, downlink transmission data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. Baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101.

Figure 12:
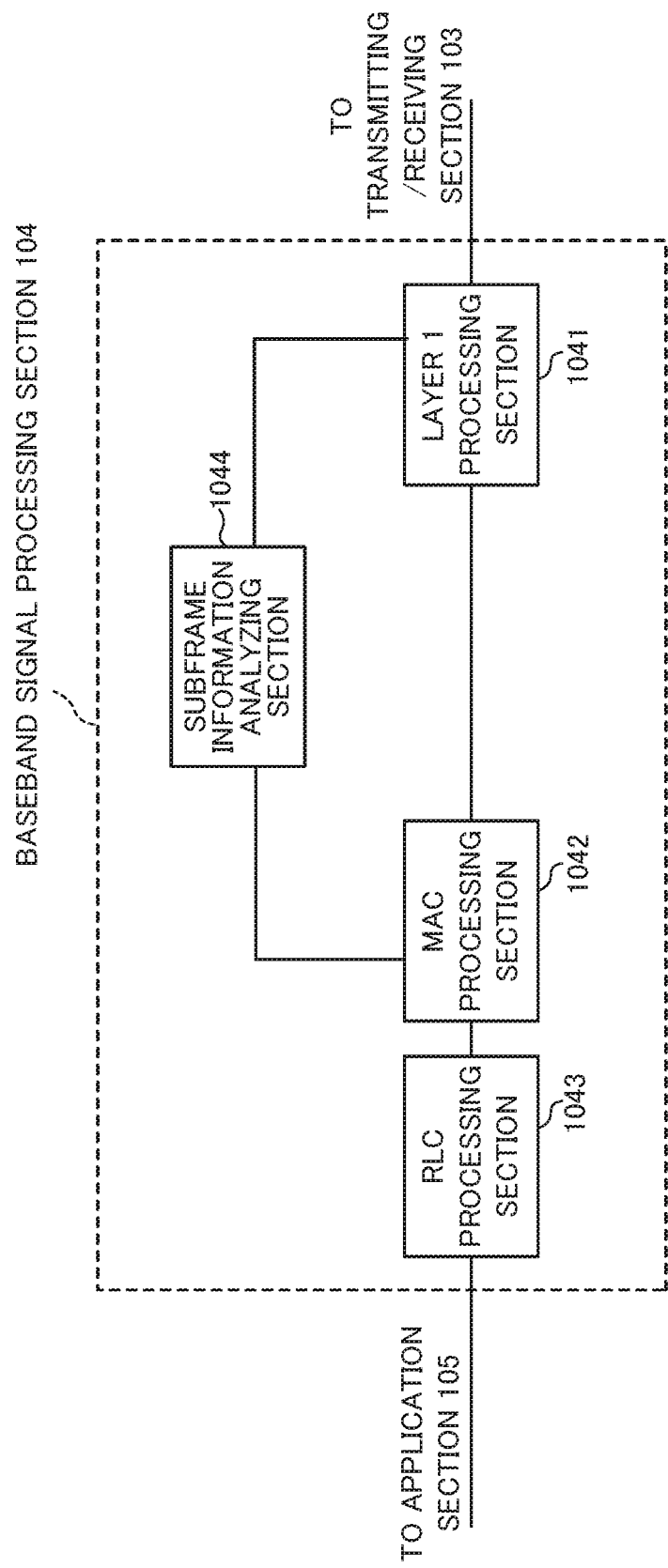
FIG. 12 is a functional block diagram corresponding to a baseband processing section of a user terminal.

FIG. 12 is a block diagram to show a configuration of a baseband signal processing section in the user terminal shown in FIG. 11. As shown in FIG. 12, the baseband signal processing section 104 is primarily formed with a layer 1 processing section 1041, a MAC processing section 1042, an RLC processing section 1043, and a subframe information analyzing section 1044.

The layer 1 processing section 1041 mainly performs processes related to the physical layer. The layer 1 processing section 1041, for example, performs processes for a signal that is received on the downlink, including channel decoding, a discrete Fourier transform (DFT), frequency demapping, an inverse fast Fourier transform (IFFT), data demodulation and so on. Also, the layer 1 processing section 1041 performs processes for a signal to transmit on the uplink, including channel coding, data modulation, frequency mapping, an inverse Fourier transform (IFFT), and so on.

For example, when the subframe to designate DL/UL subframe information is allocated to subframe #0 at the top of a radio frame, the layer 1 processing section 1041 demodulates the control signal allocated to the downlink control channel of this subframe. Then, the demodulation result is output to the subframe information analyzing section 1044. Note that, when the subframe to designate DL/UL subframe information is reported by means of a broadcast signal, RRC signaling and so on, the control signal allocated to the downlink control channel of the reported subframe is demodulated, and that demodulation result is output to the subframe information analyzing section 1044.

The MAC processing section 1042 performs, for a signal that is received on the downlink, MAC layer retransmission control (HARQ) and an analysis of downlink scheduling information (specifying the PDSCH transport format, specifying the PDSCH resource blocks and so on), and so on. Also, the MAC processing section 1042 performs, for a signal to transmit on the uplink, MAC retransmission control, and an analysis of uplink scheduling information (specifying the PUSCH transport format, specifying the PUSCH resource blocks and so on), and so on.

The RLC processing section 1043 performs, for packets received on the downlink/packets to transmit on the uplink, packet division, packet combining, RLC layer retransmission control, and so on.

The subframe information analyzing section 1044 analyzes the DL/UL subframe information designated by the control signal, from the demodulation result received as input from the layer 1 processing section 1041. For example, the subframe information analyzing section 1044 acquires the number and positions of subframes for DL transmission from the DL assignment in the DCI of the control signal. Also, the subframe information analyzing section 1044 acquires the number and positions of subframes for UL transmission from the UL grant in the DCI of the control signal.

The DL/UL subframe information analyzed in the subframe information analyzing section 1044 is output to the layer 1 processing section 1041. The layer 1 processing section 1041 applies processes to the signal received in the subframes for DL transmission designated by the DL/UL subframe information, including channel decoding, a discrete Fourier transform (DFT), frequency demapping, an inverse fast Fourier transform (IFFT), data demodulation and so on. Also, the layer 1 processing section 1041 applies processes to the signal to transmit in the subframes for UL transmission designated by the DL/UL subframe information, including channel coding, data modulation, frequency mapping, an inverse Fourier transform (IFFT), and so on.

As has been described above, with the radio communication system according to the present embodiment, even when different DL/UL configurations are adopted between neighboring radio base stations, each radio base station 20 communicates with serving user terminals 10 by switching the DL/UL configuration to adopt on a per radio frame basis. For example, each radio base station 20 selects a common DL/UL configuration with other radio base stations based on the level of interference received from the other radio base stations, and communicates with serving user terminals 10. By this means, it is possible to reduce the impact of interference between radio base stations 20 and between user terminals 10, and reduce the deterioration of the overall communication quality of the radio communication system.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-127184, filed on Jun. 4, 2012, including the specification, drawings and abstract, is incorporated herein by reference in its entirety.

The invention claimed is:

1. A user terminal performing communication in a cell where downlink (DL) and uplink (UL) configurations vary in a time direction, the user terminal comprising:

a receiver that receives downlink control information transmitted on a downlink control channel; and a processor that determines a number and positions of time regions, including at least one subframe, to be allocated for DL based on a configuration pattern index in the downlink control information indicating DL assignment, wherein the configuration pattern index represents a location of the DL assignment.

2. The user terminal according to claim 1, wherein the processor determines a number and positions of time regions, including at least one subframe, to be allocated for the UL based on the configuration pattern index in the downlink control information indicating UL grant.

3. A radio base station performing communication with a user terminal by using a cell where downlink (DL) and uplink (UL) configurations vary in a time direction, the radio base station comprising:

a processor that generates downlink control information including a configuration pattern index and information to designate a number and positions of time regions, including at least one subframe, to be allocated for DL in the downlink control information indicating DL assignment; and a transmitter that transmits the downlink control information to the user terminal on a downlink control channel, wherein the configuration pattern index represents a location of the DL assignment.

4. The radio base station according to claim 3, wherein the processor generates the downlink control information including the configuration pattern index and information to designate a number and positions of time regions, including at least one subframe, to be allocated for the UL in the downlink control information indicating UL grant.

5. A radio communication method for a user terminal performing communication in a cell where downlink (DL) and uplink (UL) configurations vary in a time direction, the radio communication method comprising:

receiving downlink control information transmitted on a downlink control channel; and determining a number and positions of time regions, including at least one subframe, to be allocated for DL based on a configuration pattern index in the downlink control information indicating DL assignment, wherein the configuration pattern index represents a location of the DL assignment.

6. The radio communication method according to claim 5, wherein the user terminal determines a number and positions of time regions, including at least one subframe, to be allocated for the UL based on the configuration pattern index in the downlink control information indicating UL grant.

* * * * *